(12) United States Patent
Tang

(10) Patent No.: US 12,554,139 B1
(45) Date of Patent: Feb. 17, 2026

(54) EYE PROTECTION DISPLAY

(71) Applicant: Xiaoli Tang, Shenzhen (CN)

(72) Inventor: Xiaoli Tang, Shenzhen (CN)

(*) Notice: Subject to any disclaimer, the term of this patent is extended or adjusted under 35 U.S.C. 154(b) by 0 days.

(21) Appl. No.: 19/248,445

(22) Filed: Jun. 24, 2025

(30) Foreign Application Priority Data

Jun. 16, 2025 (CN) .......................... 202521238778.6

(51) Int. Cl.
*G02B 27/01* (2006.01)
*G02B 27/09* (2006.01)
*G02B 27/28* (2006.01)
*G09G 3/36* (2006.01)

(52) U.S. Cl.
CPC ..... *G02B 27/0172* (2013.01); *G02B 27/0176* (2013.01); *G02B 27/0972* (2013.01); *G02B 27/285* (2013.01); *G09G 3/36* (2013.01); *G02B 2027/0112* (2013.01)

(58) Field of Classification Search
CPC .......... G02B 27/0172; G02B 27/0176; G02B 27/0972; G02B 27/285; G02B 2027/0112; G09G 3/36
See application file for complete search history.

(56) References Cited

U.S. PATENT DOCUMENTS

| | | | |
|---|---|---|---|
| 2016/0259115 A1* | 9/2016 | Kitano | G02B 5/0242 |
| 2018/0332679 A1* | 11/2018 | Li | G09G 3/3406 |
| 2020/0133068 A1* | 4/2020 | Lu | G02B 6/0073 |

* cited by examiner

*Primary Examiner* — Cory A Almeida

(57) ABSTRACT

An eye protection display includes a main body. The main body includes a display panel, a first prism layer, a light guide component, and a light source component. The light source component is used for generating light. The light generated by the light source component sequentially passes through the light guide component, a converging prism, and the display panel, thereby displaying an image through the display panel. The first prism layer includes a plurality of protruding first converging prisms. The first converging prism includes a first bottom surface, a first top surface, and a first side surface. The first side surface is connected to the first bottom surface and the first top surface. The first side surface is an arc-shaped first side surface.

20 Claims, 9 Drawing Sheets

EYE PROTECTION DISPLAY

CROSS-REFERENCE TO RELATED APPLICATIONS

The application claims priority of Chinese patent application CN 2025212387786, filed on Jun. 16, 2025, which is incorporated herein by reference in its entireties.

TECHNICAL FIELD

The present invention relates to the technical field of displays, particularly to an eye protection display.

BACKGROUND ART

In the technical field of displays, traditional backlight modules typically use LED light bars in combination with light guide components to achieve light diffusion and employ conventional prism structures for light concentration. However, the planar or right-angle structures of traditional prisms result in single light refraction path and poor uniformity, leading to glare on the screen surface. Prolonged use can easily cause discomforts such as eye dryness and headaches.

Based on this, it is necessary to provide a new display that not only achieves precise focusing and uniform distribution of light, but also effectively solves the problems of light energy loss, poor uniformity, and glare in traditional backlight modules.

SUMMARY

In order to overcome the shortcomings of the prior art, the present invention provides an eye protection display that not only achieves precise focusing and uniform distribution of light, but also effectively solves the problems of light energy loss, poor uniformity, and glare in traditional backlight modules.

The technical solution adopted by the present invention to solve its technical problem is as follows.

An eye protection display provided in the present invention includes a main body. The main body includes a display panel, a first prism layer, a light guide component, and a light source component. The light source component is used for generating light. The light generated by the light source component sequentially passes through the light guide component, a converging prism, and the display panel, thereby displaying an image through the display panel. The first prism layer includes a plurality of protruding first converging prisms. The first converging prism includes a first bottom surface, a first top surface, and a first side surface. The first side surface is connected to the first bottom surface and the first top surface. The first side surface is an arc-shaped first side surface.

As an improvement of the present invention, a width of the first converging prism gradually decreases from the first bottom surface to the first top surface.

As an improvement of the present invention, the first top surface is an arc-shaped first top surface, and the first bottom surface is a flat first bottom surface.

As an improvement of the present invention, the main body further includes a second prism layer. The second prism layer is provided with a plurality of protruding second converging prisms. The first converging prism and the second converging prism are arranged at an angle.

As an improvement of the present invention, the first converging prism and the second converging prism are arranged at an acute angle, a right angle, or an obtuse angle.

As an improvement of the present invention, the second converging prism includes a second bottom surface, a second top surface, and a second side surface. The second side surface is connected to the second bottom surface and the second top surface. The second side surface is an arc-shaped second side surface, the second top surface is an arc-shaped second top surface, and the second bottom surface is a flat second bottom surface. A width of the second converging prism gradually decreases from the second bottom surface to the second top surface.

As an improvement of the present invention, the second prism layer is positioned above the first prism layer. Moreover, the first top surface of the first converging prism and the second top surface of the second converging prism are both oriented towards the display panel.

As an improvement of the present invention, the light guide component includes a light guide plate. The light source component is arranged at a side edge of the light guide plate.

As an improvement of the present invention, the light guide plate is an acrylic light guide plate.

As an improvement of the present invention, the light guide plate is provided with an upper surface and a lower surface opposite to the upper surface. The upper surface is oriented towards the display panel. A reflective film is provided on the lower surface. The reflective film is configured for reflecting the light emitted from the light source component to the lower surface to the upper surface.

As an improvement of the present invention, the main body further includes a dual prism sheet film. The dual prism sheet film is a DBEF reflective polarizing film.

As an improvement of the present invention, the dual prism sheet film is disposed between the second prism layer and the display panel. The dual prism sheet film is provided with a first frosted surface, and a frosted ratio of the first frosted surface is 40%-85%.

As an improvement of the present invention, the main body further includes a first diffusion film. The first diffusion film is disposed between the light guide component and the first prism layer. The first diffusion film is used for diffusing the light generated by the light source component towards the second prism layer. The first diffusion film is provided with a second frosted surface, and a frosted ratio of the second frosted surface is 86%-95%.

As an improvement of the present invention, the main body further includes a second diffusion film. The second diffusion film is disposed between the dual prism sheet film and the display panel. The second diffusion film is used for diffusing light towards the display panel. The second diffusion film is provided with a third frosted surface. A frosted ratio of the third frosted surface is 40%-85%.

As an improvement of the present invention, the main body further includes a cover plate disposed above the display panel. The cover plate is a diffuse reflection glass cover plate.

As an improvement of the present invention, the cover plate is provided with a fourth frosted surface. The fourth frosted surface is formed by etching the cover plate with an acidic solution. A frosted ratio of the fourth frosted surface is 2.8%-8%, and a light transmittance range of the fourth frosted surface is 96%-99%.

As an improvement of the present invention, the light source component includes at least one LED light bar. The LED light bar is arranged at an edge of the light guide component. The LED light bar includes a plurality of LED lamp beads. The LED lamp beads are low-blue-light and high-color-gamut LED lamp beads.

As an improvement of the present invention, an emission wavelength range of a blue light chip of the LED lamp bead is 457 nm-485 nm.

As an improvement of the present invention, the main body further includes a frame component. The frame component includes a housing. The cover plate is arranged to cover the housing, and forms a sealed cavity with the housing. The display panel, the first prism layer, the light guide component, and the light source component are all arranged inside the sealed cavity. The frame component also includes a fixing frame. The fixing frame is installed inside the housing to fix the display panel to the housing. A side edge of the fixing frame is also equipped with a collision-proof strip. The collision-proof strip is configured for preventing friction and collision between the display panel and the fixing frame.

As an improvement of the present invention, a DC constant current chip is also electrically connected to the display panel. The DC constant current chip is used for adjusting a current of the light source component to linearly adjust the brightness of the light source component. The main body further includes a driving board and a plurality of FPC wiring boards. The driving board, the FPC wiring board, and the display panel are electrically connected.

Beneficial effects of the present invention are as follows. The eye protection display provided in the present invention includes the main body. The main body includes the display panel, the first prism layer, the light guide component, and the light source component. The light source component is used for generating light. The light generated by the light source component sequentially passes through the light guide component, the converging prism, and the display panel, thereby displaying an image through the display panel. The first prism layer includes a plurality of protruding first converging prisms. The first converging prism includes the first bottom surface, the first top surface, and the first side surface. The first side surface is connected to the first bottom surface and the first top surface. The first side surface is an arc-shaped first side surface. The arc-shaped side surface of the present invention enables smooth transmission of light during refraction and reflection, reducing the stimulation of direct and high-intensity beams on the eyes, minimizing glare and scattered light, effectively reducing eye fatigue, and better protecting the viewer's visual acuity.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
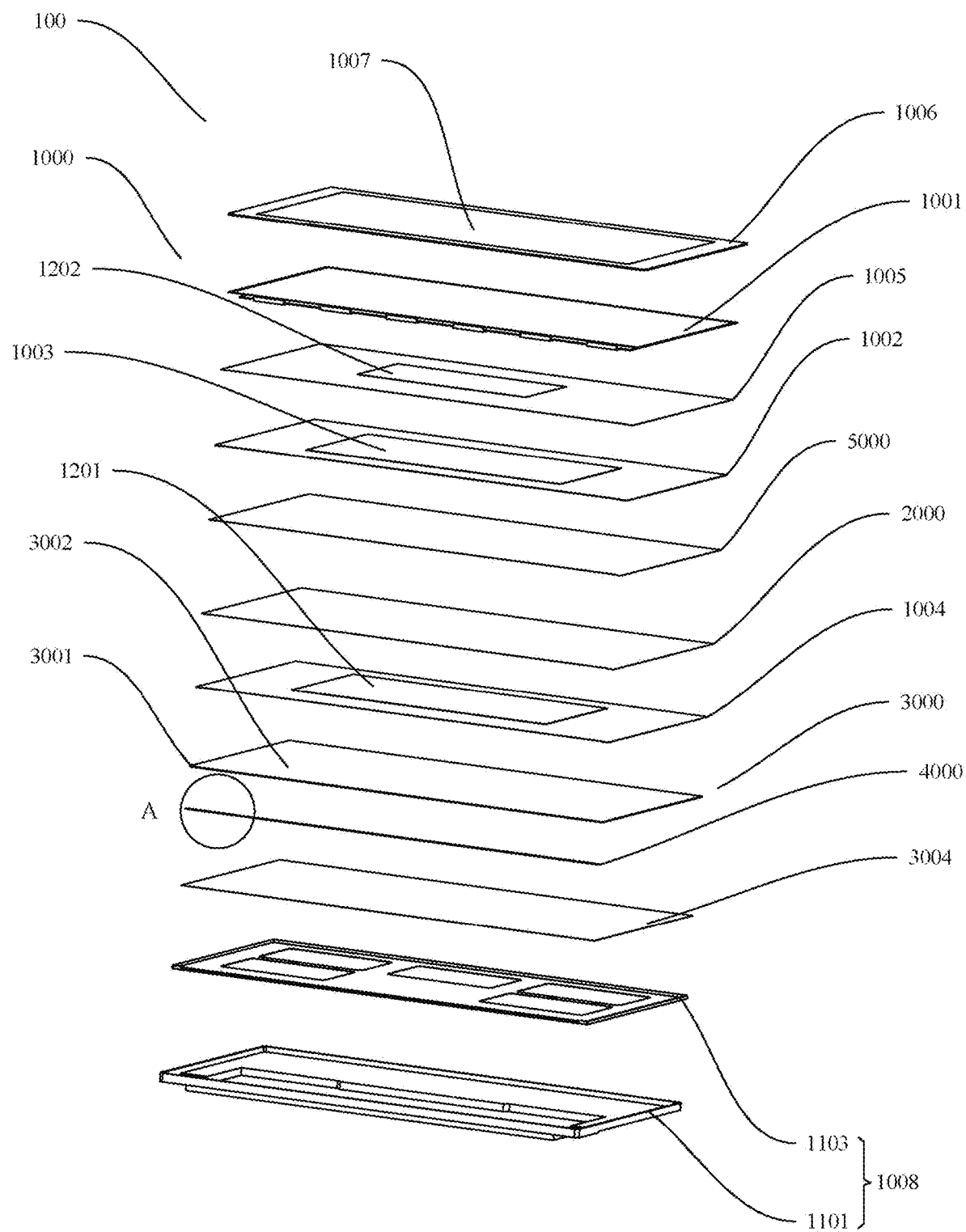
FIG. 1 is a schematic diagram of an exploded structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
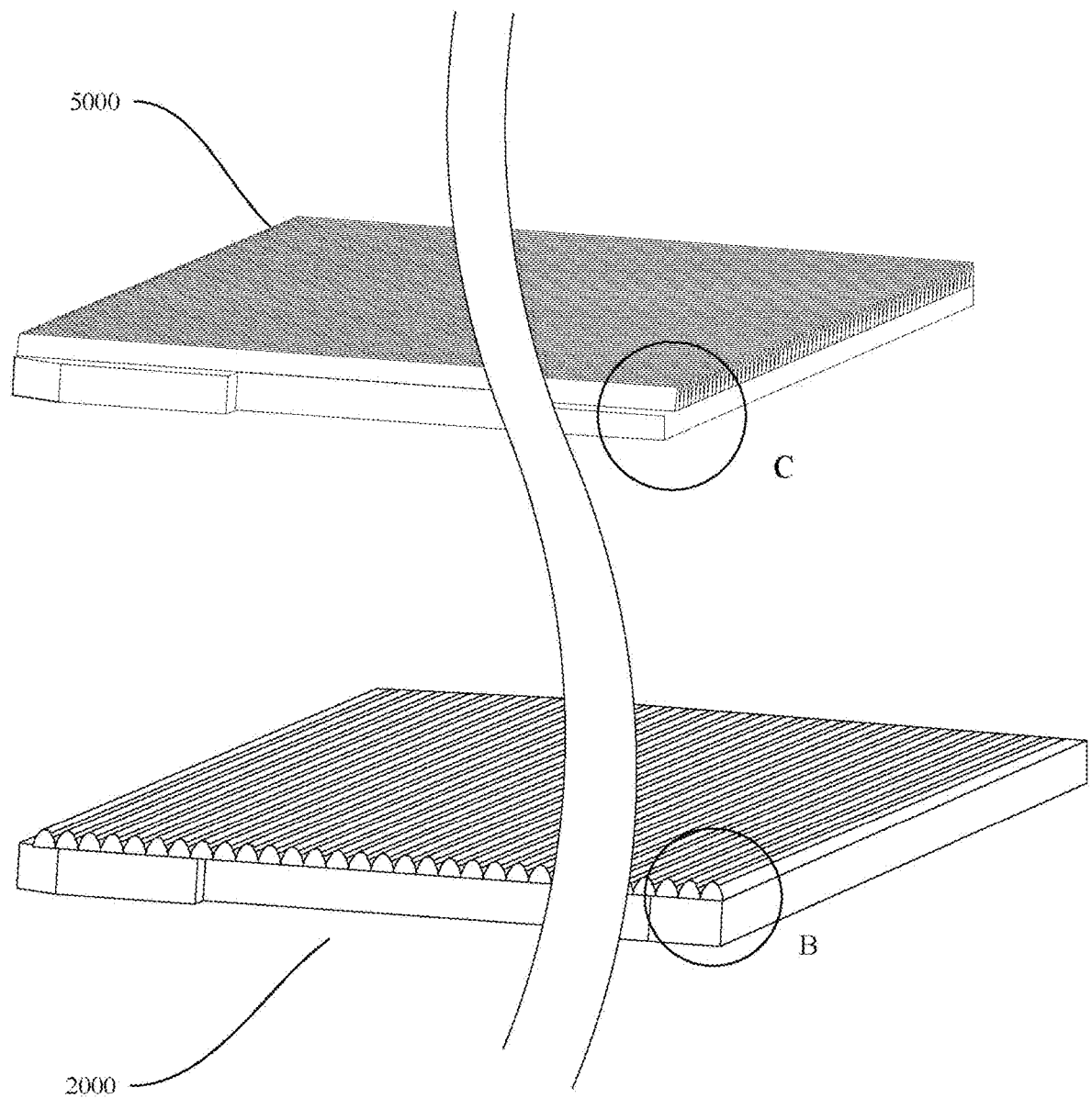
FIG. 2 is a schematic structural diagram of a first prism layer and a second prism layer.
Figure 3:
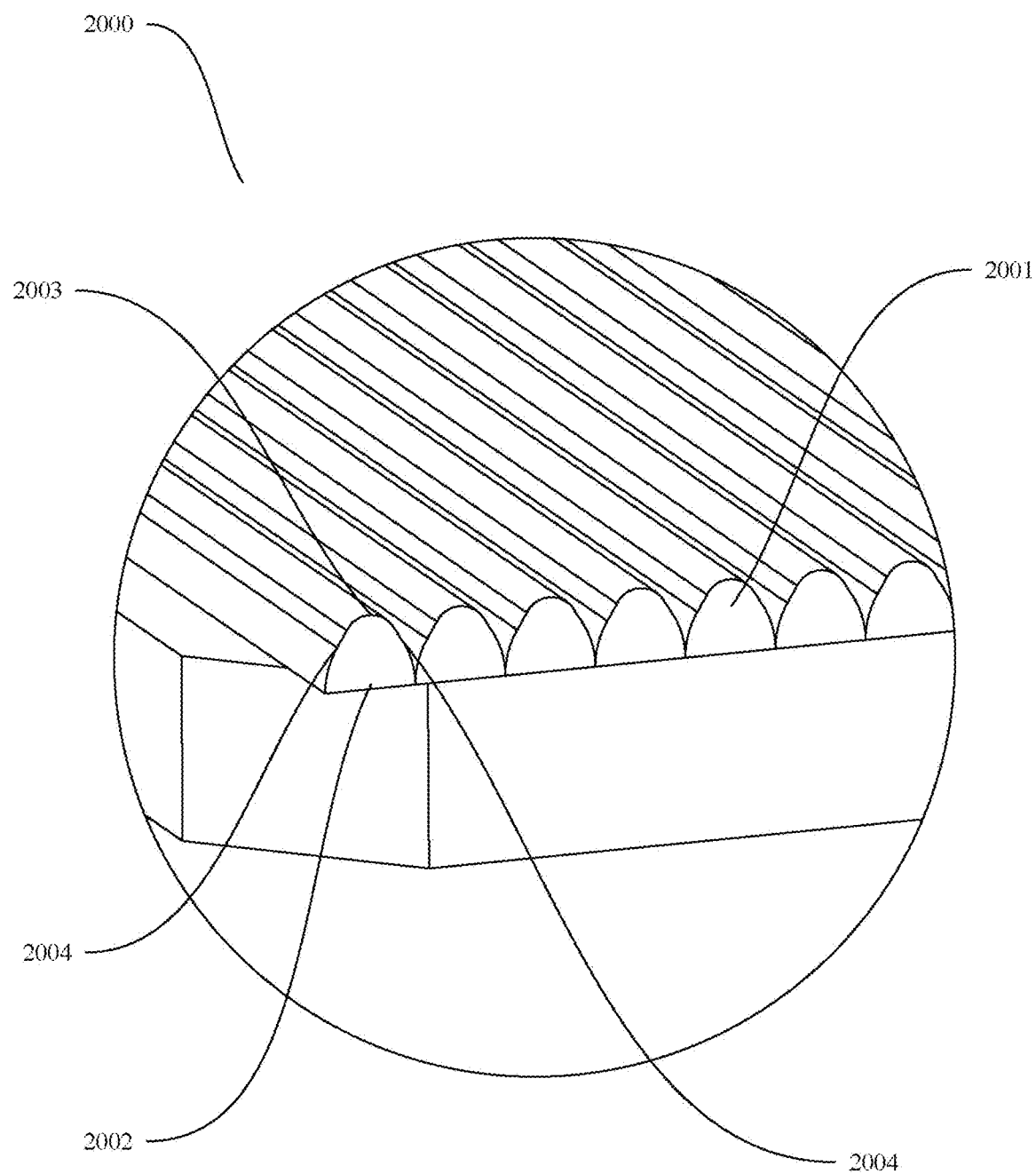
FIG. 3 is a partially enlarged structural diagram of area B in FIG. 2.

Referring to FIGS. 1-9, an eye protection display 100 disclosed in the present invention includes a main body 1000. The main body 1000 includes a display panel 1001, a first prism layer 2000, a light guide component 3000, and a light source component 4000. The light source component 4000 is used for generating light. The light generated by the light source component 4000 sequentially passes through the light guide component 3000, a converging prism, and the display panel 1001, thereby displaying an image through the display panel 1001. As shown in FIG. 3, the first prism layer 2000 includes a plurality of protruding first converging prisms 2001. The first converging prism 2001 includes a first bottom surface 2002, a first top surface 2003, and a first side surface 2004. The first side surface 2004 is connected to the first bottom surface 2002 and the first top surface 2003. The first side surface 2004 is an arc-shaped first side surface 2004. The arc-shaped side surface of the first converging prism 2001 enables smooth transmission of light during refraction and reflection, reducing the stimulation of direct and high-intensity beams on the eyes, minimizing glare and scattered light, effectively reducing eye fatigue, and better protecting the viewer's visual acuity.

In this embodiment, a width of the first converging prism 2001 gradually decreases from the first bottom surface 2002 to the first top surface 2003. Through the above structure, the light generated by the light source component 4000 can be more concentrated and uniformly refracted to the display panel 1001, improving the overall optical uniformity, thereby making the image display more stable and without significant brightness differences.

In this embodiment, the first top surface 2003 is an arc-shaped first top surface 2003, and the first bottom surface 2002 is a flat first bottom surface 2002. The arc-shaped first top surface 2003 enables the light passing through the first converging prism 2001 to obtain a smoother refractive curve when exiting, resulting in more precise and gentle light focusing. The flat bottom surface provides a stable and uniform incident light environment, ensuring that the light remains consistent in state before entering the prism structure. Through the above structure, a focusing effect of the light can be effectively improved, ensuring the uniform distribution of light spots on the display panel 1001 and reducing the problems of local over-brightness or overlapping light spots.

Figure 4:
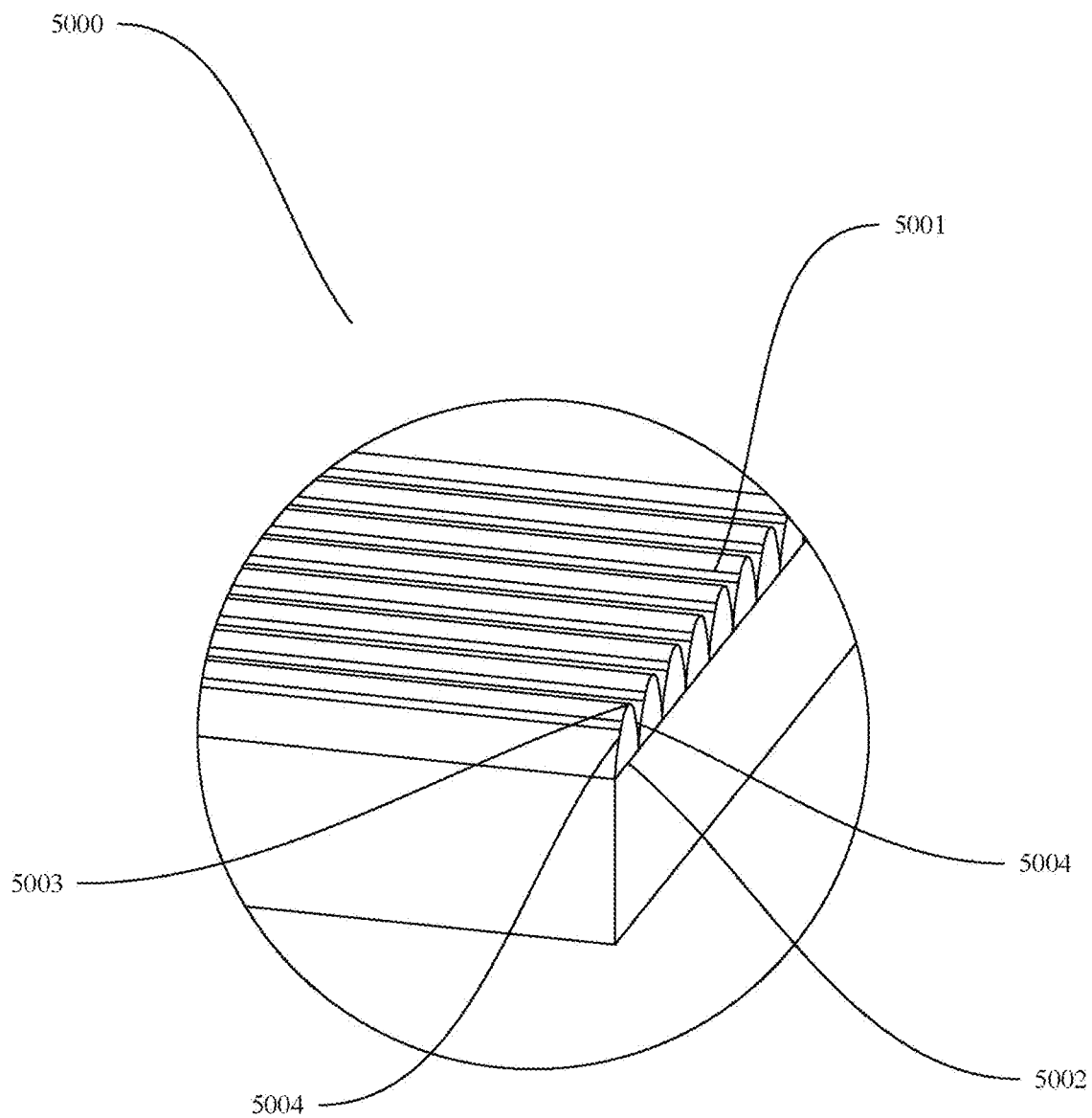
FIG. 4 is a partially enlarged structural diagram of area C in FIG. 2.
Figure 5:
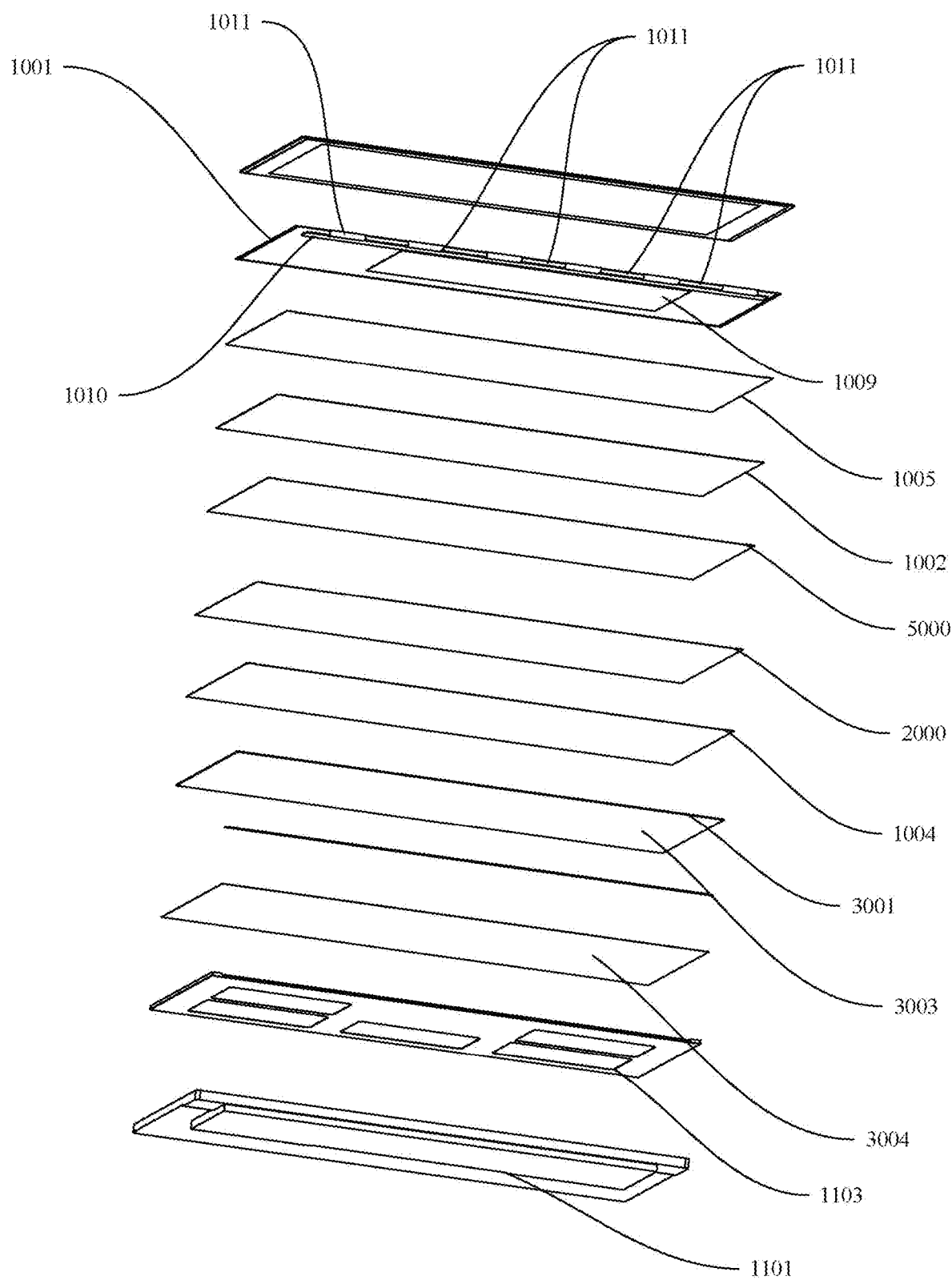
FIG. 5 is a schematic diagram of an exploded structure of the present invention from another angle of view.
Figure 6:
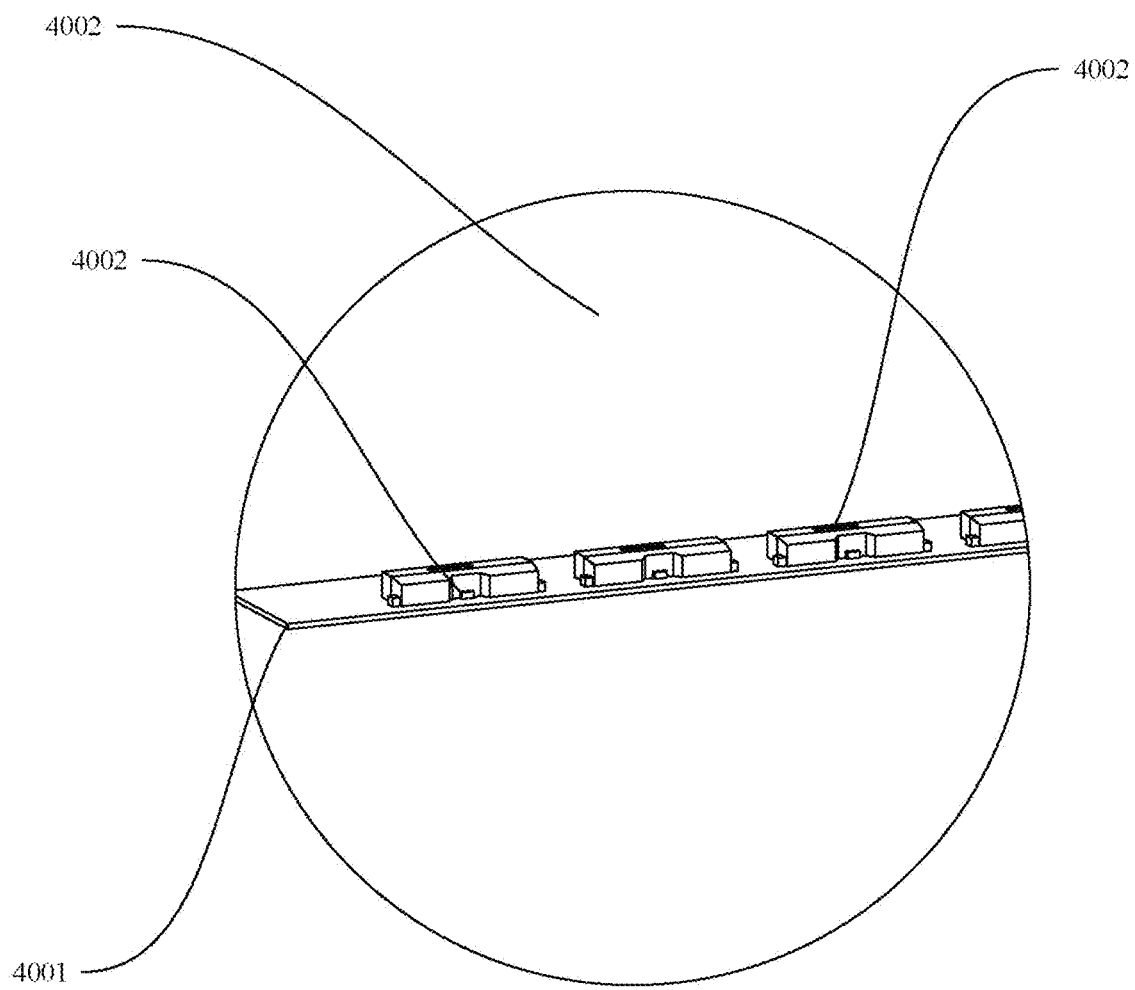
FIG. 6 is a partially enlarged structural diagram of area A in FIG. 1.
Figure 7:
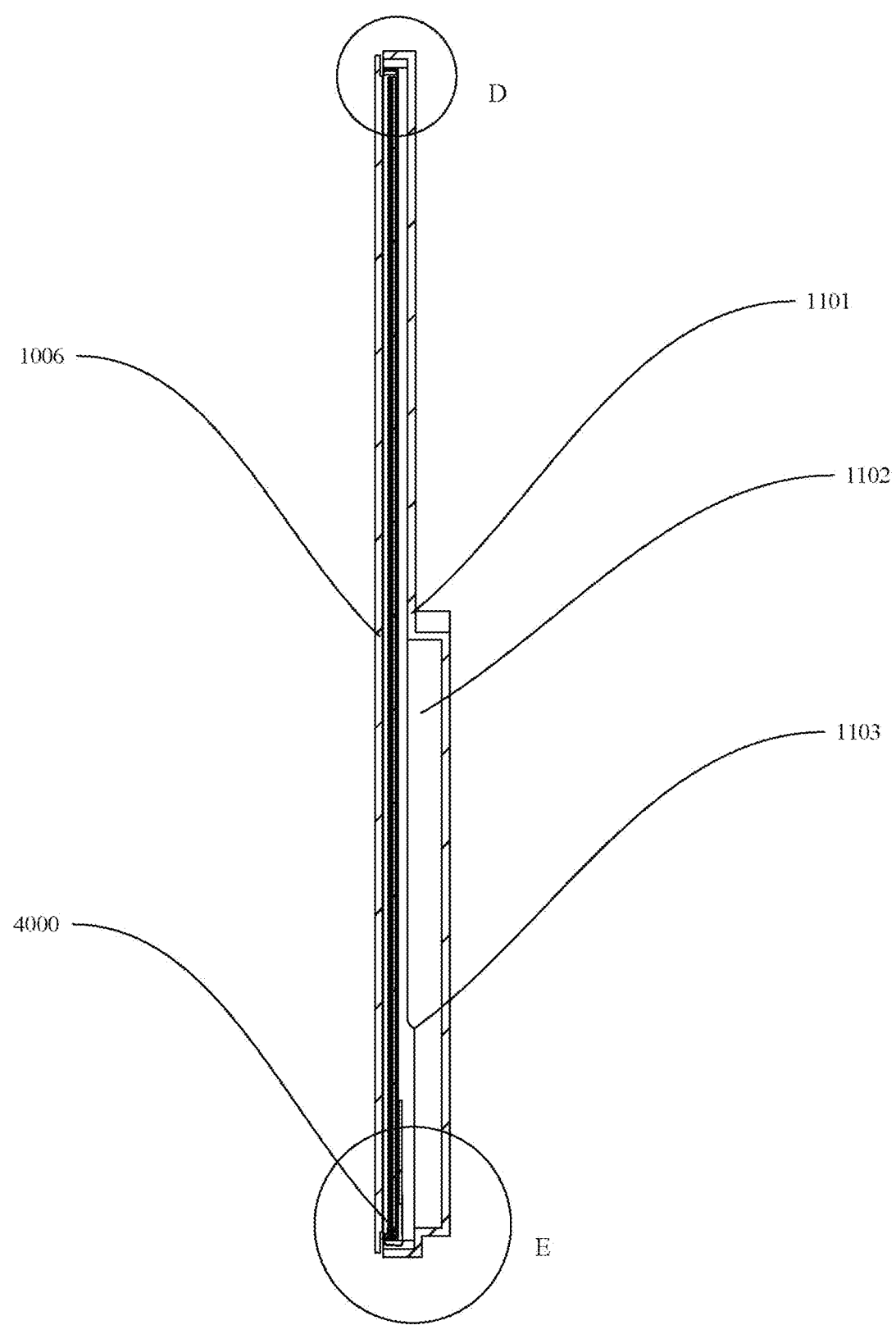
FIG. 7 is a schematic diagram of a cross-sectional structure of the present invention.
Figure 8:
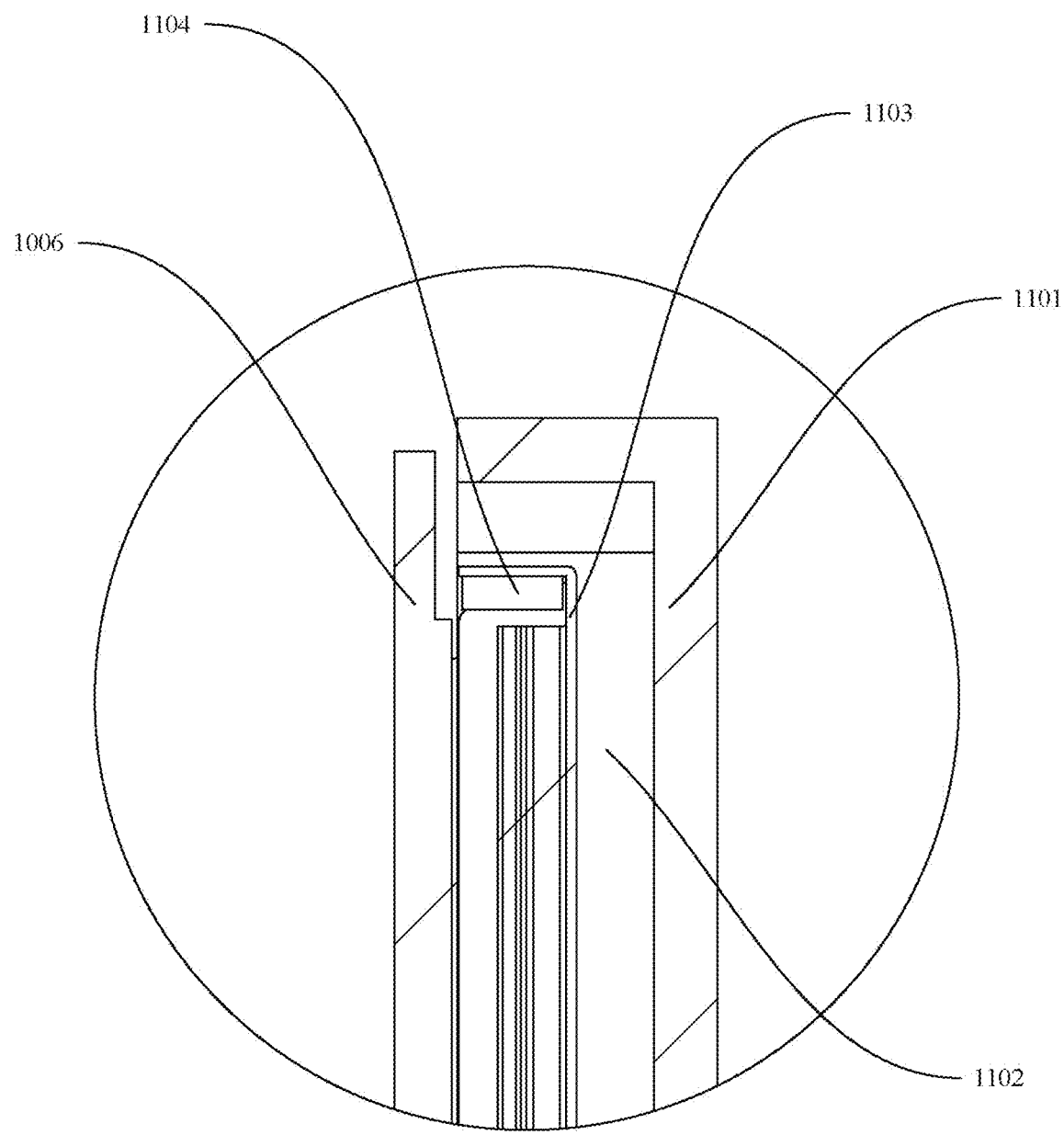
FIG. 8 is a partially enlarged structural diagram of area D in FIG. 7.
Figure 9:
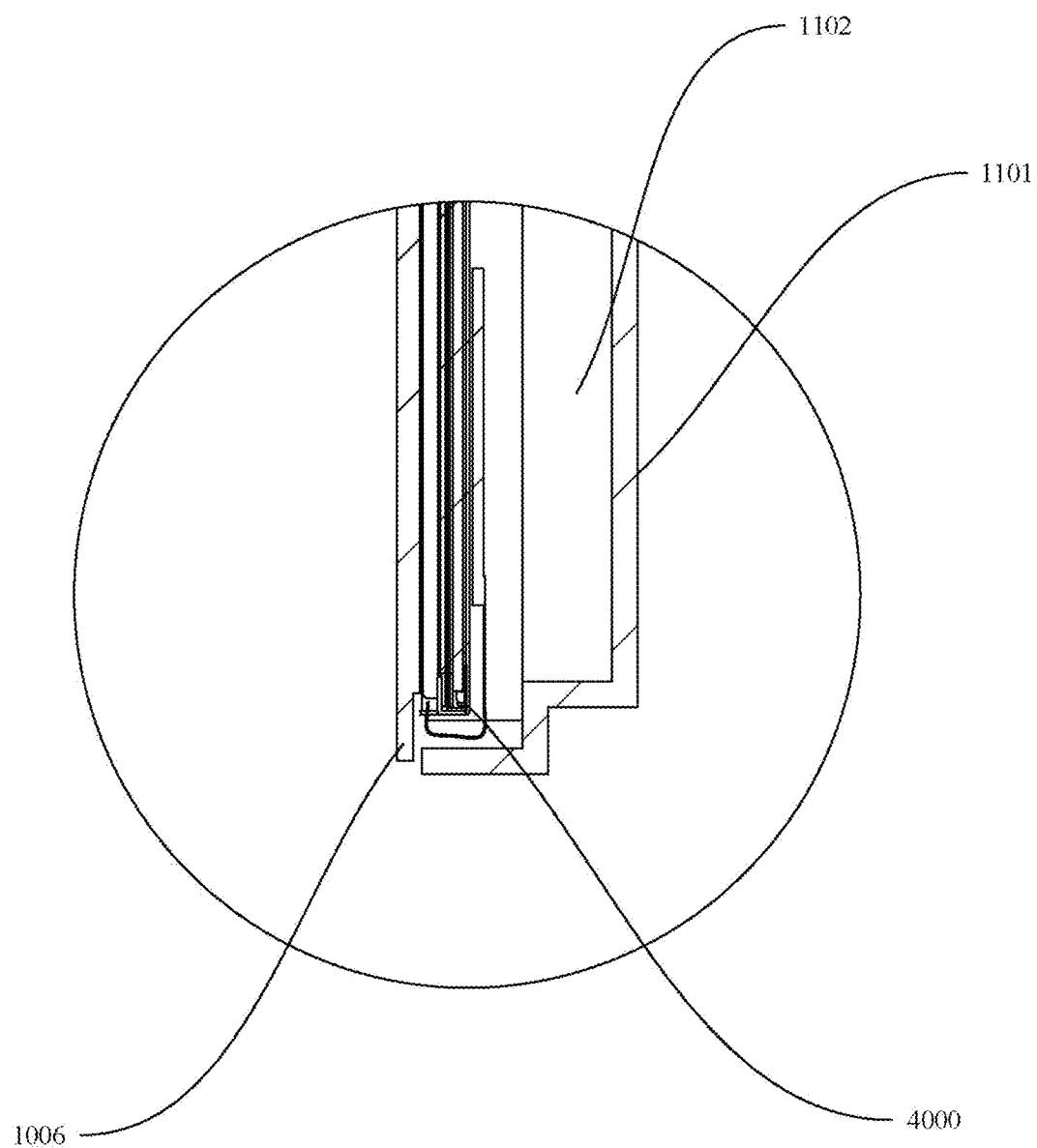
FIG. 9 is a partially enlarged structural diagram of area E in FIG. 7.

As a preferred option of this embodiment, the main body 1000 further includes a second prism layer 5000. As shown in FIG. 4, the second prism layer 5000 is provided with a plurality of protruding second converging prisms 5001. As shown in FIGS. 2-4, the first converging prism 2001 and the second converging prism 5001 are arranged at an angle. By setting an angle between the first converging prism 2001 and the second converging prism 5001, a multi-level control optical path system is formed. The first converging prism 2001 first guides and focuses the light, and when the modulated light enters the second prism layer 5000, the second converging prism 5001 further finely adjusts the beam direction and distribution, so that the light can be more evenly irradiated on the display panel 1001, reducing local over-brightness or unevenness, making the image more stable and softer, thereby reducing eye fatigue during long-term use and significantly improving eye protection effect.

As a preferred option of this embodiment, the first converging prism 2001 and the second converging prism 5001 are arranged at an acute angle, a right angle, or an obtuse angle.

Specifically, in the present invention, the first converging prism 2001 and the second converging prism 5001 are arranged at a right angle, effectively solving the problem of high-energy concentration caused by direct light. After adjustment by the first converging prism 2001 and the second converging prism 5001, the emitted beam is more uniform and softer, which can significantly reduce glare. For a user who uses the display for a long time, eye fatigue can be effectively relieved, and a better eye protection effect is achieved.

In this embodiment, the second converging prism 5001 includes a second bottom surface 5002, a second top surface 5003, and a second side surface 5004. The second side surface 5004 is connected to the second bottom surface 5002 and the second top surface 5003. The second side surface 5004 is an arc-shaped side surface, the second top surface 5003 is an arc-shaped top surface, and the second bottom surface 5002 is a flat bottom surface. A width of the second converging prism 5001 gradually decreases from the second bottom surface 5002 to the second top surface 5003. By adding the second prism layer 5000 with the arc-shaped side surface and the arc-shaped top structure, the fine focusing, balanced distribution, and efficient utilization of light are further achieved, thereby reducing glare, improving optical efficiency, and enhancing visual comfort and eye protection to a greater extent.

In this embodiment, the second prism layer 5000 is positioned above the first prism layer 2000. Moreover, the first top surface 2003 of the first converging prism 2001 and the second top surface 5003 of the second converging prism 5001 are both oriented towards the display panel 1001. Through the above structure, the light can be further focused and homogenized, resulting in a more uniform distribution of the beam refracted onto the display panel 1001.

In this embodiment, the light guide component 3000 includes a light guide plate 3001, which reduces the stimulation of direct and concentrated light beams on the eyes and reduces glare, thereby helping to alleviate eye discomfort and visual fatigue caused by long-term use of the display, and significantly improving eye protection performance.

In this embodiment, the light source component 4000 is arranged at a side edge of the light guide plate 3001, thereby achieving efficient light energy coupling and transmission, reducing the loss of light energy during transmission. The above structure also makes the structure of the display more compact, making the product thinner and lighter, and providing the user with a better user experience.

Specifically, the light guide plate 3001 is an acrylic light guide plate 3001. Acrylic material has high transparency, which reduces the loss of light during transmission. At the same time, since the acrylic has a high refractive index, incident light can be effectively transmitted through the total internal reflection principle and uniformly diffused into an area light source, thereby ensuring that the brightness of each area on the display panel 1001 is uniform, and eliminating the phenomenon of hot spots.

As a preferred option, the acrylic light guide plate 3001 is formed by hot pressing process. Through the hot pressing process, a high-precision micro-structure can be achieved in the acrylic light guide plate, effectively improving optical uniformity. Additionally, the hot pressing process can reduce material waste, achieve high utilization rate, and effectively save manufacturing costs.

In other embodiments, the light guide plate 3001 can also be a silicone light guide plate 3001, a glass light guide plate 3001, or a polycarbonate (PC) light guide plate 3001.

In this embodiment, the light guide plate 3001 is provided with an upper surface 3002 and a lower surface 3003 opposite to the upper surface 3002. The upper surface 3002 is oriented towards the display panel 1001. A reflective film 3004 is provided on the lower surface 3003. The reflective film 3004 is configured for reflecting the light emitted from the light source component 4000 to the lower surface 3003 to the upper surface 3002. With the cooperation of the reflective film 3004, the light guide plate 3001 converts the light generated by the light source component 4000 from a linear light source to an area light source. By arranging the reflective film 3004, the light efficiency loss caused by light energy dissipation is effectively reduced, thereby improving the overall optical efficiency and display brightness, making the output of the area light source formed on the display panel 1001 more uniform and stable, and avoiding glare caused by local excessive brightness of light.

In this embodiment, the main body 1000 further includes a dual prism sheet film 1002. The dual prism sheet film 1002 is disposed between the second prism layer 5000 and the display panel 1001. The dual prism sheet film 1002 can filter polarized light that does not meet the requirements of the display panel 1001, and reduce glare caused by scattering and reflection, thereby improving image contrast ratio.

As a preferred option, the dual prism sheet film 1002 is a DBEF (Dual Brightness Enhancement Film) reflective polarizing film. The DBEF reflective polarizing film has efficient polarization selectivity, which helps to improve the brightness and contrast of the display image, and can maintain a good balance of various color components in the output light of the display panel 1001, thereby improving the overall color saturation and contrast of the image, making the picture more vivid and realistic. At the same time, it can ensure that the display effect is always stable and excellent in different environments.

In this embodiment, the dual prism sheet film 1002 is provided with a first frosted surface 1003 (i.e., first matte surface), and a frosted ratio of the first frosted surface 1003 is 40%-85%. By arranging the first frosted surface 1003, the light modulated by the second prism layer 5000 can be made more uniform, avoiding the phenomenon of local over brightness or low brightness caused by concentrated light spots, and achieving a more ideal area light source effect.

In this embodiment, the main body 1000 further includes a first diffusion film 1004. The first diffusion film 1004 is disposed between the light guide component 3000 and the first prism layer 2000. The first diffusion film 1004 is used for diffusing the light generated by the light source component 4000 towards the second prism layer 5000. In addition, the first diffusion film 1004 is provided with a second frosted surface 1201 (i.e., second matte surface), and a frosted ratio of the second frosted surface 1201 is 86%-95%. The first diffusion film 1004 can fully scatter the light from the light guide plate 3001, making the light entering the second prism layer 5000 present a wider angular distribution, thereby helping to improve the uniformity of a light field on the entire display panel 1001 and avoiding obvious local hot spots or dark areas.

In this embodiment, the main body 1000 further includes a second diffusion film 1005. The second diffusion film 1005 is disposed between the dual prism sheet film 1002 and the display panel 1001. The second diffusion film 1005 is used for diffusing light towards the display panel 1001. Moreover, the second diffusion film 1005 is provided with a third frosted surface 1202 (i.e., third matte surface). A frosted ratio of the third frosted surface 1202 is 40%-85%. By arranging the second diffusion film 1005, the light is further diffused and softened, effectively avoiding local brightness inconsistencies and ensuring a consistent light field on the entire display panel 1001.

In this embodiment, the main body 1000 further includes a cover plate 1006 disposed above the display panel 1001. The cover plate 1006 is a diffuse reflection glass cover plate 1006. A surface structure of diffuse reflection glass can effectively scatter incident light, allowing light from the display panel 1001 or the environment to be uniformly diffused when passing through the cover plate 1006, avoiding the formation of obvious reflection hot spots or specular reflection effects, thereby reducing glare and improving visual comfort.

In this embodiment, the cover plate 1006 is provided with a fourth frosted surface 1007 (i.e., fourth matte surface), and the first frosted surface 1003 is oriented towards the fourth frosted surface 1007. By arranging the first frosted surface 1003 and the fourth frosted surface 1007, the light passing through the cover plate 1006 is evenly dispersed before entering the display panel 1001, further eliminating local bright spots and dark areas, thereby achieving a more uniform light field distribution. Specifically, the fourth frosted surface 1007 is formed by etching the cover plate 1006 with an acidic solution. A frosted ratio of the fourth frosted surface 1007 is 2.8%-8%, and a light transmittance range of the fourth frosted surface 1007 is 96%-99%.

In this embodiment, the light source component 4000 includes at least one LED light bar 4001. The LED light bar 4001 is arranged at an edge of the light guide component 3000. The LED light bar 4001 includes a plurality of LED lamp beads 4002. The LED lamp beads 4002 are low-blue-light and high-color-gamut LED lamp beads 4002. The use of the low-blue-light and high-color-gamut LED lamp beads 4002 effectively reduces the output of blue light components, thereby reducing the stimulation to the retina and improving the eye protection effect for the user when using the display for a long time.

In this embodiment, an emission wavelength range of a blue light chip of the LED lamp bead 4002 is 457 nm-485 nm, and a beam path of the LED lamp bead 4002 is provided with phosphor. By limiting a blue light wavelength of the LED lamp bead 4002 to 457 nm-485 nm, not only precise white light tuning and color balance are achieved, but also matching phosphor conversion technology can be better utilized to obtain a more balanced and natural white light effect, and achieve excellent color rendering performance.

In this embodiment, the main body 1000 further includes a frame component 1008. The frame component 1008 includes a housing 1101. The cover plate 1006 is arranged to cover the housing 1101, and forms a sealed cavity 1102 with the housing 1101. The display panel 1001, the first prism layer 2000, the light guide component 3000, and the light source component 4000 are all arranged inside the sealed cavity 1102. Through the above structure, scattering and absorption of the light transmission path caused by dust and moisture in the air can be effectively prevented, thus improving the optical efficiency and brightness of the display panel 1001 while ensuring more uniform color rendering and brightness distribution.

In this embodiment, the frame component 1008 also includes a fixing frame 1103. The fixing frame 1103 is installed inside the housing 1101 to fix the display panel 1001 to the housing 1101, to prevent the display panel 1001 from shifting or shaking due to vibration or external force, thereby ensuring that the display panel 1001 is always in an optimal display state.

In this embodiment, a side edge of the fixing frame 1103 is also equipped with a collision-proof strip 1104. The collision-proof strip 1104 is configured for preventing friction and collision between the display panel 1001 and the fixing frame 1103. Specifically, the collision-proof strip 1104 is made of foam rubber. As a soft material, the foam rubber has good elasticity and shock absorption characteristics, and can form an effective isolation layer between the display panel 1001 and the fixing frame 1103. When the display panel 1001 is subjected to external impact or undergoes small displacement, the foam rubber can absorb and evenly cushion the impact energy, thereby preventing the panel from direct hard collision or frictional damage with the fixing frame 1103.

In this embodiment, a DC constant current chip 1009 is also electrically connected to the display panel 1001. The DC constant current chip 1009 is used for adjusting a current of the light source component 4000 to linearly adjust the brightness of the light source component 4000, thereby ensuring the balance and stability of image display at different brightness levels, and improving the overall color accuracy and contrast of the display.

In this embodiment, the main body 1000 further includes a driving board 1010 and flexible printed circuit (FPC) wiring boards 1011. The driving board 1010, the FPC wiring board 1011, and the display panel 1001 are electrically connected. Through the above structure, not only has signal transmission and system integration been optimized, but the comprehensive performance of the product in terms of thinness and lightness, stability, and ease of maintenance has also been improved.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An eye protection display, comprising:
   a main body; wherein the main body comprises a display panel, a first prism layer, a light guide component, and a light source component;
   wherein the light source component is used for generating light;
   the first prism layer comprises a plurality of protruding first converging prisms; the first converging prism comprises a first bottom surface, a first top surface, and a first side surface; the first side surface is connected to the first bottom surface and the first top surface; and the first side surface is an arc-shaped first side surface;
   the light generated by the light source component sequentially passes through the light guide component, the first conversing prisms of the first prism layer, and the display panel, thereby displaying an image through the display panel;
   wherein the main body further comprises a second prism layer; the second prism layer is provided with a plurality of protruding second converging prisms;
   wherein the second converging prism comprises a second bottom surface, a second top surface, and a second side surface; the second side surface is connected to the second bottom surface and the second top surface; the second top surface is an arc-shaped second top surface.

2. The eye protection display according to claim 1, wherein a width of the first converging prism gradually decreases from the first bottom surface to the first top surface.

3. The eye protection display according to claim 2, wherein the first top surface is an arc-shaped first top surface; and the first bottom surface is a flat first bottom surface.

4. The eye protection display according to claim 3, wherein the first converging prism and the second converging prism are arranged at an angle.

5. The eye protection display according to claim 4, wherein the first converging prism and the second converging prism are arranged at an acute angle, a right angle, or an obtuse angle.

6. The eye protection display according to claim 1, wherein the main body further comprises a frame component; the frame component comprises a housing; the cover plate is arranged to cover the housing, and forms a sealed cavity with the housing; the display panel, the first prism layer, the light guide component, and the light source component are all arranged inside the sealed cavity; the frame component also comprises a fixing frame; the fixing frame is installed inside the housing to fix the display panel to the housing; a side edge of the fixing frame is also equipped with a collision-proof strip; and the collision-proof strip is configured for preventing friction and collision between the display panel and the fixing frame.

7. The eye protection display according to claim 1, wherein a DC constant current chip is also electrically connected to the display panel; the DC constant current chip is used for adjusting a current of the light source component to linearly adjust the brightness of the light source component; the main body further comprises a driving board and a plurality of FPC wiring boards; and the driving board, the FPC wiring board, and the display panel are electrically connected.

8. An eye protection display, comprising:
   a main body; wherein the main body comprises a display panel, a first prism layer, a light guide component, and a light source component;
   wherein the light source component is used for generating light;
   the first prism layer comprises a plurality of protruding first converging prisms; the first converging prism comprises a first bottom surface, a first top surface, and a first side surface; the first side surface is connected to the first bottom surface and the first top surface; and the first side surface is an arc-shaped first side surface;
   the light generated by the light source component sequentially passes through the light guide component, the first converging prisms of the first prism layer, and the display panel, thereby displaying an image through the display panel;
   wherein a width of the first converging prism gradually decreases from the first bottom surface to the first top surface;
   wherein the first top surface is an arc-shaped first top surface; and the first bottom surface is a flat first bottom surface;
   wherein the main body further comprises a second prism layer; the second prism layer is provided with a plurality of protruding second converging prisms; and the first converging prism and the second converging prism are arranged at an angle;
   wherein the first converging prism and the second converging prism are arranged at an acute angle, a right angle, or an obtuse angle;
   wherein the second converging prism comprises a second bottom surface, a second top surface, and a second side surface; the second side surface is connected to the second bottom surface and the second top surface; the second side surface is an arc-shaped second side surface; the second top surface is an arc-shaped second top surface; the second bottom surface is a flat second bottom surface; and a width of the second converging prism gradually decreases from the second bottom surface to the second top surface.

9. The eye protection display according to claim 8, wherein the second prism layer is positioned above the first prism layer; and the first top surface of the first converging prism and the second top surface of the second converging prism are both oriented towards the display panel.

10. The eye protection display according to claim 9, wherein the light guide component comprises a light guide plate; and the light source component is arranged at a side edge of the light guide plate.

11. The eye protection display according to claim 10, wherein the light guide plate is an acrylic light guide plate.

12. The eye protection display according to claim 11, wherein the light guide plate is provided with an upper surface and a lower surface opposite to the upper surface; the upper surface is oriented towards the display panel; a reflective film is provided on the lower surface; and the reflective film is configured for reflecting the light emitted from the light source component to the lower surface to the upper surface.

13. The eye protection display according to claim 12, wherein the main body further comprises a dual prism sheet film; and the dual prism sheet film is a DBEF reflective polarizing film.

14. The eye protection display according to claim 13, wherein the dual prism sheet film is disposed between the second prism layer and the display panel; the dual prism sheet film is provided with a first frosted surface; and a frosted ratio of the first frosted surface is 40%-85%.

15. The eye protection display according to claim 14, wherein the main body further comprises a first diffusion film; the first diffusion film is disposed between the light guide component and the first prism layer; the first diffusion film is used for diffusing the light generated by the light source component towards the second prism layer; the first diffusion film is provided with a second frosted surface; and a frosted ratio of the second frosted surface is 86%-95%.

16. The eye protection display according to claim 15, wherein the main body further comprises a second diffusion film; the second diffusion film is disposed between the dual prism sheet film and the display panel; the second diffusion film is used for diffusing light towards the display panel; the second diffusion film is provided with a third frosted surface; and a frosted ratio of the third frosted surface is 40%-85%.

17. The eye protection display according to claim 16, wherein the main body further comprises a cover plate disposed above the display panel; and the cover plate is a diffuse reflection glass cover plate.

18. The eye protection display according to claim 17, wherein the cover plate is provided with a fourth frosted surface; the fourth frosted surface is formed by etching the cover plate with an acidic solution; a frosted ratio of the fourth frosted surface is 2.8%-8%; and a light transmittance range of the fourth frosted surface is 96%-99%.

19. The eye protection display according to claim 18, wherein the light source component comprises at least one LED light bar; the LED light bar is arranged at an edge of the light guide component; the LED light bar comprises a plurality of LED lamp beads; and the LED lamp beads are low-blue-light and high-color-gamut LED lamp beads.

20. The eye protection display according to claim 19, wherein an emission wavelength range of a blue light chip of the LED lamp bead is 457 nm-485 nm.

* * * * *